(12) United States Patent
Kim et al.

(10) Patent No.: US 9,788,272 B2
(45) Date of Patent: Oct. 10, 2017

(54) METHOD OF REDUCING CONSUMPTION OF STANDBY CURRENT IN A MOBILE TERMINAL

(71) Applicant: Samsung Electronics Co., Ltd., Gyeonggi-do (KR)

(72) Inventors: Jong-Han Kim, Gyeonggi-do (KR); Jeong-Gyun Yu, Seoul (KR); Yong-Duk Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 128 days.

(21) Appl. No.: 14/717,420

(22) Filed: May 20, 2015

(65) Prior Publication Data
US 2016/0014692 A1    Jan. 14, 2016

Related U.S. Application Data

(60) Provisional application No. 62/021,989, filed on Jul. 8, 2014.

(30) Foreign Application Priority Data

Sep. 11, 2014  (KR) .................. 10-2014-0120244

(51) Int. Cl.
*H04W 52/02* (2009.01)
*H04W 56/00* (2009.01)
*H04W 48/16* (2009.01)

(52) U.S. Cl.
CPC ....... *H04W 52/0216* (2013.01); *H04W 48/16* (2013.01); *H04W 52/0229* (2013.01); *H04W 56/001* (2013.01); *Y02B 60/50* (2013.01)

(58) Field of Classification Search
CPC ......... H04W 52/0216; H04W 52/0229; H04W 48/16; H04W 56/001; Y02B 60/50
See application file for complete search history.

(56) References Cited

U.S. PATENT DOCUMENTS

| 6,067,460 A | 5/2000 | Alanara et al. |
| 2003/0117996 A1 | 6/2003 | Lim et al. |
| 2003/0202541 A1* | 10/2003 | Lim ..................... H04B 1/7083 370/503 |

(Continued)

FOREIGN PATENT DOCUMENTS

JP   2004-194226   7/2004

*Primary Examiner* — Jianye Wu
(74) *Attorney, Agent, or Firm* — The Farrell Law Firm, P.C.

(57) ABSTRACT

A method of reducing power consumption is provided. The method includes categorizing a plurality of cells including a serving cell into an identified cell set and a non-identified cell set based on received power of the plurality of cells, measuring received power of the plurality of cells including the serving cell based on a first measurement period during a first time interval, determining whether received power of the serving cell is greater than a predefined threshold or whether a number of cells included in the identified cell set or a configuration of the plurality of cells changes, or if one of the received power of the serving cell is greater than the predefined threshold and if the number of cells included in the identified cell set or the configuration of the plurality of cells does not change, changing the first measurement period to a second measurement period.

16 Claims, 10 Drawing Sheets

(56) References Cited

U.S. PATENT DOCUMENTS

| | | |
|---|---|---|
| 2004/0043798 A1 | 3/2004 | Amerga et al. |
| 2006/0172759 A1 | 8/2006 | Ishihara |
| 2006/0246895 A1 | 11/2006 | Ryu |
| 2007/0223510 A1 | 9/2007 | Joo |
| 2008/0004023 A1* | 1/2008 | Chen ................ H04W 52/0229 455/436 |
| 2008/0285494 A1 | 11/2008 | Shin |
| 2008/0318643 A1 | 12/2008 | Manna et al. |
| 2009/0010229 A1* | 1/2009 | Kazmi ................ H04W 52/243 370/336 |
| 2010/0317394 A1* | 12/2010 | Harris ................ H04W 52/367 455/522 |
| 2011/0216732 A1* | 9/2011 | Maeda .................... H04W 4/08 370/329 |
| 2011/0280144 A1 | 11/2011 | Mohseni et al. |
| 2013/0258876 A1 | 10/2013 | Damji et al. |
| 2014/0057631 A1 | 2/2014 | Zhang et al. |
| 2015/0215830 A1* | 7/2015 | Dalsgaard ......... H04W 36/0094 455/444 |

\* cited by examiner

METHOD OF REDUCING CONSUMPTION OF STANDBY CURRENT IN A MOBILE TERMINAL

PRIORITY

This application claims priority under 35 U.S.C. §119(e) to a U.S. Provisional Patent Application Ser. No. 62/021,989, which was filed in the U.S. Patent and Trademark Office on Jul. 8, 2014, and under 35 U.S.C. §119(a) to Korean Patent Application Serial No. 10-2014-0120244, which was filed in the Korean Intellectual Property Office on Sep. 11, 2014, the entire disclosures of which are incorporated herein by reference.

BACKGROUND

1. Field of the Disclosure

The present disclosure relates generally to an apparatus and a method for reducing consumption of a standby current of a mobile terminal in a Code Division Multiple Access (CDMA) mobile communication system, and more particularly, to an apparatus and a method for maintaining an idle state to be as short as possible and keeping a sleep state to be as long as possible in order to reduce power consumption of a mobile terminal.

2. Description of the Related Art

When a mobile terminal is not making a call or not transmitting/receiving data in a cellular mobile communication system, the mobile terminal may transition into an idle state or a standby state. In the idle state, the mobile terminal performs paging reception in a unit of predetermined Discontinuous Reception (DRX) cycles and measurements for cell reselection (i.e., cell measurement). When paging reception and cell measurements are completed, the mobile terminal may block a power supply such that power to components of the mobile terminal is cut off or turn off a clock of a mobile, which is not being used, and enter a sleep state in order to reduce power consumption in the standby state. Before a next paging reception interval, the mobile terminal may repeatedly perform the paging reception and cell measurements by supplying power to the components of the mobile terminal and by turning on the clock.

In the DRX cycle, a state in which paging reception and cell measurements are performed is defined as a wake-up state and a state in which power and clocks are shut off to reduce power consumption is defined as a sleep state. Accordingly, as the wake-up state is shorter and the sleep state is longer in the DRX cycle, consumption of a standby current can be further reduced.

Therefore, in order to reduce power consumption of the mobile terminal, an apparatus and a method for maintaining the idle state as short as possible and keeping the sleep state as long as possible is required.

SUMMARY

The present disclosure has been made to address at least the above mentioned problems and/or disadvantages and to provide at least the advantages described below.

An aspect of the present disclosure provides a method and an apparatus for reducing consumption of a standby current of a mobile terminal.

Another aspect of the present disclosure provides an apparatus and a method for maintaining an idle state as short as possible and keeping a sleep state as long as possible in order to reduce power consumption of a mobile terminal.

Another aspect of the present disclosure provides an apparatus and a method for changing a period of cell measurement performed in a wake-up state of a DRX cycle in order to reduce power consumption of a mobile terminal.

Another aspect of the present disclosure provides a method and an apparatus for determining whether a mobile terminal is in a stop state.

Another aspect of the present disclosure provides an apparatus and a method for effectively performing neighboring cell measurement for cell reselection.

BRIEF DESCRIPTION OF THE DRAWINGS

The above and other aspects, features and advantages of the present disclosure will be more apparent from the following detailed description in conjunction with the accompanying drawings, in which.

DETAILED DESCRIPTION

Hereinafter, various embodiments of the present disclosure will be described in detail with reference to the accompanying drawings. Further, in the following description of the present disclosure, a detailed description of known functions and configurations incorporated herein will be omitted when it renders the subject matter of the present disclosure unclear. The terms which will be described below are terms defined in consideration of the functions in the present disclosure, and may be different according to users, intentions of the users, or customs. Accordingly, the definitions of the terms should be made on the basis of the overall context of the present disclosure.

Various embodiments of the present disclosure describe a method and an apparatus for reducing consumption of a standby current of a mobile terminal. Particularly, a method of reducing consumption of standby power by controlling a period of neighboring cell measurement in a CDMA mobile communication system will be described.

In accordance with an aspect of the present disclosure there is provided a method of reducing power consumption of a mobile terminal. The method includes categorizing a plurality of cells including a serving cell into an identified cell set and a non-identified cell set based on received power of the plurality of cells, measuring received power of each of the plurality of cells including the serving cell based on a first measurement period during a first time interval, determining whether received power of the serving cell is greater than a predefined threshold or whether a number of cells included in the identified cell set or a configuration of the plurality of cells changes, and if received power of the serving cell is greater than the predefined threshold or if the number of cells included in the identified cell set or the configuration of the plurality of cells does not change, changing the first measurement period to a second measurement period, which is longer than the first measurement period, during a second time interval.

In accordance with an aspect of the present disclosure there is provided a mobile terminal. The mobile terminal includes a measurement unit for categorizing a plurality of cells including a serving cell into an identified cell set and a non-identified cell set based on received power of the plurality of cells and measuring received power of each of the plurality of cells including the serving cell based on a first measurement period during a first time interval and a controller for determining whether received power of the serving cell is greater than a predefined threshold or whether a number of cells included in the identified cell set or a configuration of the plurality of cells changes, and changing the first measurement period to a second measurement period, which is longer than the first measurement period, if the received power of the serving cell is greater than the predefined threshold or if the number of cells included in the identified cell set or the configuration of the plurality of cells does not change during a second time interval.

In accordance with an aspect of the present disclosure there is provided a method of reducing power consumption of a mobile terminal. The method includes measuring received power of each of a plurality of cells including a serving cell based on a first measurement period during a first time interval, determining whether the mobile terminal is in a stop state based on the measured received power of each of the plurality of cells, changing a the measurement period to a second measurement period, which is longer than the first measurement period, during a second time interval according to whether the mobile terminal is in the stop state, and measuring received power of each of the plurality of cells based on the second measurement period during the second time interval.

In accordance with an aspect of the present disclosure there is provided a system on chip (SoC) for reducing power consumption of a mobile terminal. The SoC includes a measurement module for categorizing a plurality of cells including a serving cell into an identified cell set and a non-identified cell set based on received power of the plurality of cells and measuring received power of each of the plurality of cells including the serving cell based on a first measurement period during a first time interval and a controller module for determining whether received power of the serving cell is greater than a predefined threshold or whether a number of cells included in the identified cell set or a configuration of the plurality of cells changes, and changing the first measurement period to a second measurement period, which is longer than the first measurement period, if one of the received power of the serving cell is greater than the predefined threshold or if the number of cells included in the identified cell set or the configuration of the plurality of cells does not change during a second time interval.

In accordance with an aspect of the present disclosure there is provided a system on chip (SoC) for reducing power consumption of a mobile terminal. The SoC includes a measurement module for measuring received power of each of a plurality of cells including a serving cell based on a first measurement period during a first time interval and a controller module for determining whether the mobile terminal is in a stop state based on the measured received power of each of the plurality of cells, changing the measurement period to a second measurement period, which is longer than the first measurement period, during a second time interval according to whether the mobile terminal is in the stop state, and measuring received power of each of the plurality of cells based on the second measurement period during the second time interval.

Figure 1A:
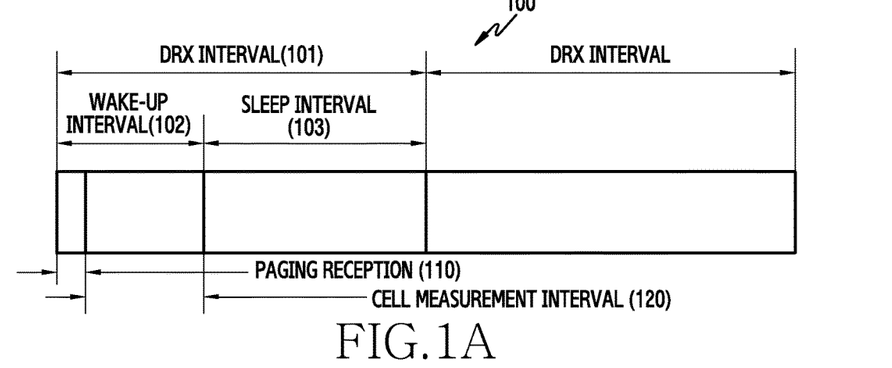
FIG. 1A is a diagram illustrating a DRX cycle, according to an embodiment of the present disclosure.

FIG. 1A is a diagram illustrating a DRX cycle 100, according to an embodiment of the present disclosure.

Referring to FIG. 1A, a DRX interval 101 is divided into a wake-up interval 102 and a sleep interval 103. During the wake-up interval 102, a mobile terminal may receive a paging signal 110 (i.e., paging reception) or perform a neighbor cell measurement interval 120 (hereinafter, simply referred to as cell measurement 120) for cell reselection in a wake-up state. The sleep interval 103 corresponds to a state where power supply or clocks are blocked (or shut off) in a module, which is not used, of the mobile terminal.

The paging signal 110 includes information indicating whether there are calls or data to be received by the mobile terminal, and the mobile terminal identifies whether the received paging information includes an identifier of the mobile terminal (or identifiers of a plurality of mobile terminals).

The cell measurement 120 corresponds to an interval where reception power of neighboring cells, e.g., for determining cell reselection criteria, is measured. For example, the cell measurement 120 can include measurement of reception power of a pilot signal or reference signal transmitted to the mobile terminal from a base station or measurement of a signal to interference ratio (for example, $E_c/I_o$). $E_c/I_o$ may refer to a ratio of energy of pilot signals accumulated for one PN chip (e.g., a PN junction chip) period to total power spectral density in a reception band, and may indicate reception sensitivity of the mobile terminal.

For example, in a CDMA mobile communication system, the mobile terminal may measure Common Pilot Channel (CPICH) Ec/Io or CPICH Received Signal code Power (RSCP) for 32 intra-frequency cells (including a serving cell) on at least every DRX cycle or measure CPICH Ec/Io or CPICH RSCP for 32 inter-frequency cells on every predetermined number of DRX cycles.

The measurement for cell reselection (for example, the cell measurement 120) may be divided into a serving cell measurement and a neighboring cell measurement. The neighboring cell measurement may be further divided into an identified cell, in which a frame offset is detected, and a non-identified cell, in which a frame offset is not detected. Since the frame offset is detected in the serving cell and the identified cell, reception power (or energy) of the cell may be measured through a multipath search. In other words, the reception power of the cell may be measured using only a multipath search without a slot and frame synchronization process in the serving cell and the identified cell. However, the reception power of the cell may be measured through a multipath search after a cell search process for detecting a frame offset is performed for a slot and a frame synchronization process in a non-identified cell (see Table 1 below). The cell search process may be performed through a slot synchronization, frame synchronization and code-group identification, and scrambling-code identification. Slot synchronization acquires slot synchronization by matching a first synchronization code and a received signal through a matched filter. Frame synchronization and code-group identification acquires frame synchronization and identifies a code group through a second synchronization code. Scrambling-code identification determines a scrambling code through a symbol by symbol correlation.

TABLE 1

| Cell | Measurement scheme |
| --- | --- |
| Serving cell | Multipath search |
| Identified neighbor cell | Multipath search |
| Non-identified neighbor cell | Cell search process -> Multipath search |

Conventional mobile terminals spend most of the wake-up interval on performing measurements on the non-identified cell, due to the extra time required to perform measurements on all of the DRX cycles. In accordance with the present disclosure, the wake-up interval is reduced by performing measurement on the non-identified cell on several DRX cycles instead of every DRX cycle or configuring a measurement period to be as long as possible, according to a predetermined condition to reduce power consumption in an idle state.

Figure 1B:
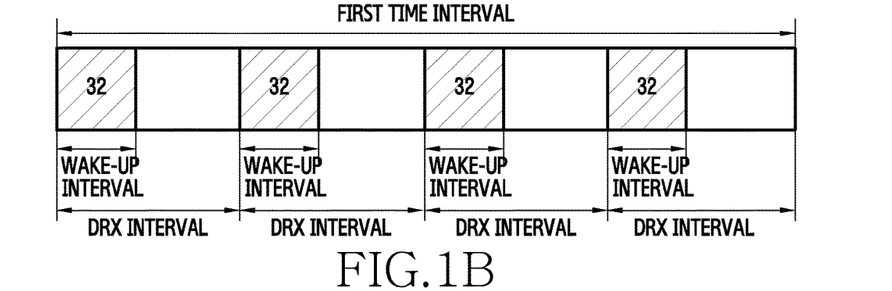
FIGS. 1B-1D are diagrams illustrating a DRX cycle according to a cell measurement period during a predetermined time interval, according to an embodiment of the present disclosure.
Figure 1C:
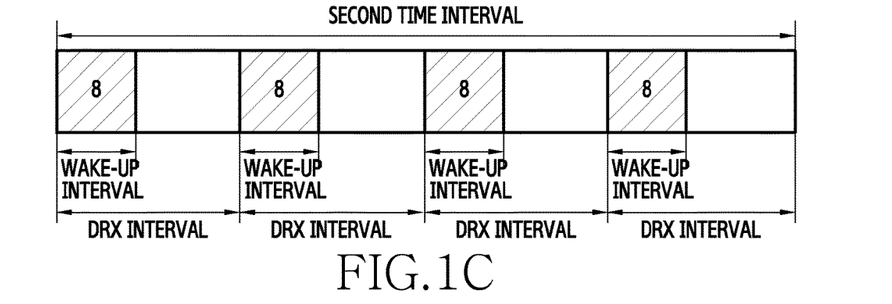
Figure 1D:
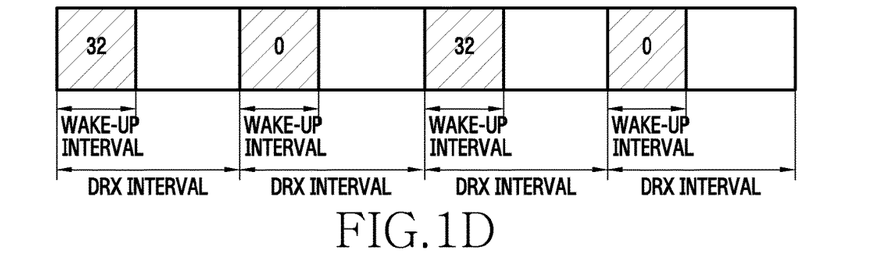

FIGS. 1B-1D are diagrams illustrating a DRX cycle according to a cell measurement period during a predetermined time interval, according to an embodiment of the present disclosure.

Referring to FIG. 1B, CPICH Ec/Io or CPICH RSCP measurement is performed for 32 intra-frequency cells (including a serving cell) on every DRX cycle during a first time interval. Here, since the 32 intra-frequency cells are measured on every DRX cycle, it is assumed that a measurement period is 1.

Referring to FIG. 1C, CPICH Ec/Io or CPICH RSCP measurement is performed for 8 intra-frequency cells (including a serving cell) on every DRX cycle during a second time interval. Here, since the 32 intra-frequency cells are measured on four DRX cycles, a measurement period may be 4.

For example, since the measurement period of FIG. 1C is longer than the measurement period of FIG. 1B, the cell measurement time or interval of FIG. 1C may be shorter than that of FIG. 1B, i.e., since only the 8 intra-frequency cells are measured during the DRX cycle.

The measurement period may be changed, as illustrated in FIG. 1D. For example, CPICH Echo or CPICH RSCP may be measured for 32 intra-frequency cells during odd numbered DRX cycles and CPICH Ec/Io or CPICH RSCP may not be measured for the intra-frequency cells during even numbered DRX cycles.

Figure 2:
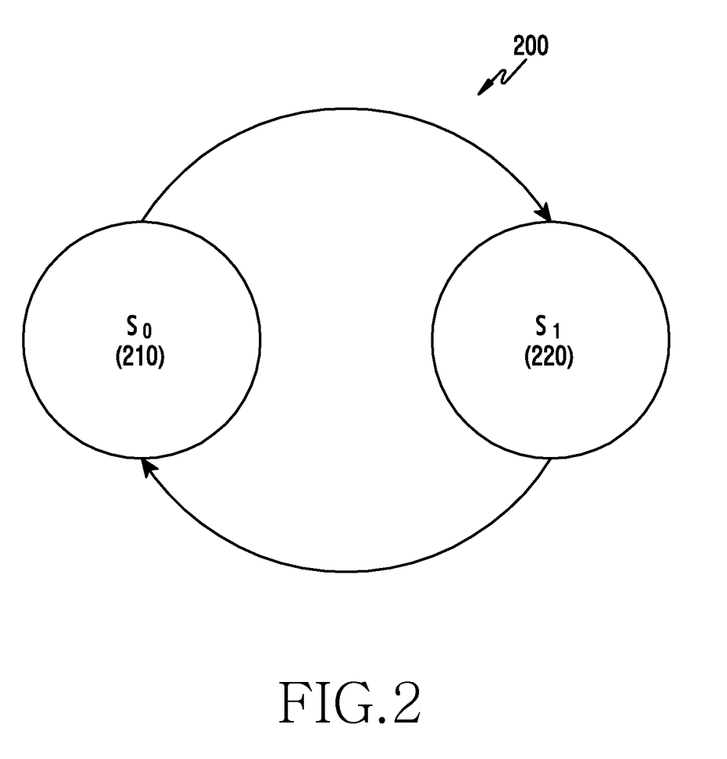
FIG. 2 is a diagram illustrating state transition according to a cell measurement period within a DRX cycle, according to an embodiment of the present disclosure.

The cell measurement period may vary depending on a cell measurement period state transition, as shown in FIG. 2 below.

FIG. 2 is a diagram illustrating a state transition 200 according to a cell measurement period within a DRX cycle, according to an embodiment of the present disclosure.

Referring to FIG. 2, the state transition 200 may be divided into S0 210 and S1 220. The state transition 200 is not limited to a state transition based on the two states, and those skilled in the art would appreciate that state transition may be divided into n states and n cell measurement periods.

The state of S0 210 is a state in which CPICH Ec/Io or CPICH RSCP of 32 intra-frequency cells is measured on every DRX cycle, as illustrated in FIG. 1B, and the state of S1 220 is a state in which CPICH Ec/Io or CPICH RSCP of 32 intra-frequency cells is measured on a plurality of DRX cycles, as illustrated in FIG. 1C and/or FIG. 1D. For example, a measurement period of the state of S0 210 is shorter than a measurement period of the state of S1 220.

The cell measurement is performed in an initial state of S0 210, and the state of S0 210 transitions to the state of S1 220 based on a result of the cell measurement. For example, when it is determined that the mobile terminal is in a stop state, i.e., not moving, based on the result of the cell measurement, the cell measurement may be performed based on the transition to the state of S1 220. Conversely, when it is determined that the mobile terminal is in a mobile state, not the stop state, the cell measurement may be performed based on the transition to the state of S0 210. A state transition between the state of S0 210 and the state of S1 220 will be described in greater detail below with reference to FIGS. 5-8.

Figure 3:
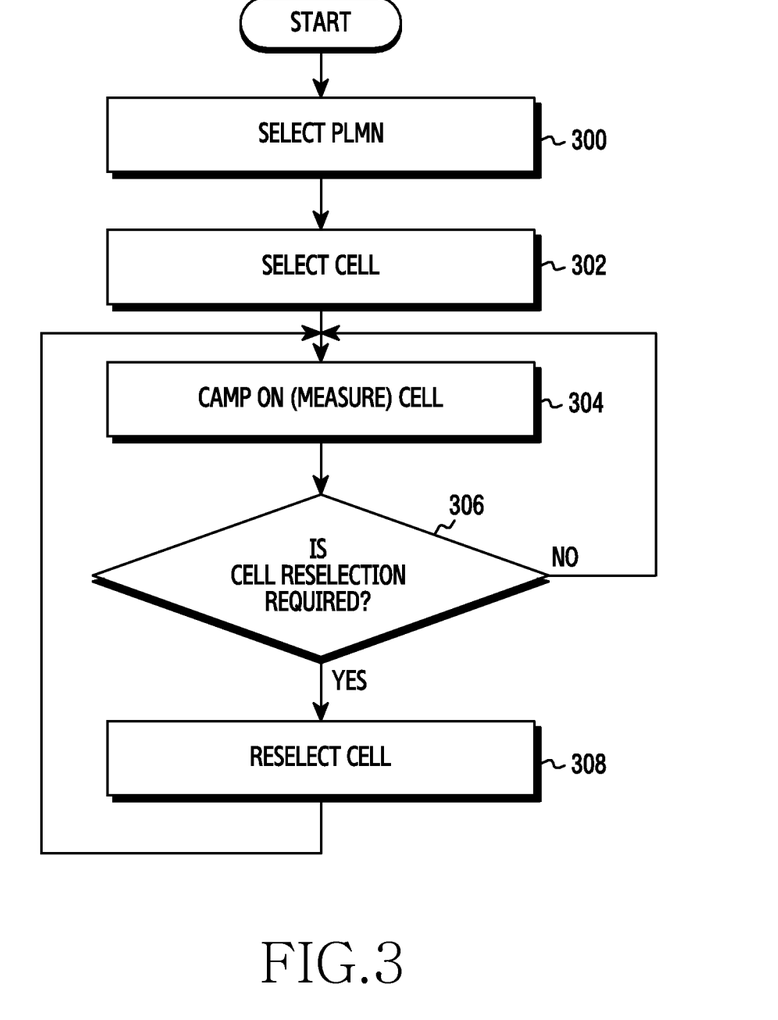
FIG. 3 is a flowchart illustrating a method in which a mobile terminal enters a network, according to an embodiment of the present disclosure.

FIG. 3 is a flowchart illustrating a method in which the mobile terminal enters a network, according to an embodiment of the present disclosure.

Referring to FIG. 3, when power of the mobile terminal is turned on, the mobile terminal searches for, and may select, an available Public Land Mobile Network (PLMN) by scanning RF channels, at step 300.

The mobile terminal selects a cell having the strongest signal from among cells within the selected PLMN, at step 302 and camps on (or registers at) the selected cell, at step 304. In the camped-on state, the mobile terminal monitors related system information or performs measurement (for example, cell measurement) for a cell reselection evaluation process. A detailed description of the camped-on state is discussed below with reference to FIG. 4.

The mobile terminal determines whether cell reselection is required based on the cell measurement, at step 306. For example, the mobile terminal determines whether there is a cell having a better channel state than that of the current camped-on cell.

The mobile terminal proceeds to step 304 when the cell reselection is not required and proceeds to step 308 when the cell reselection is required, thereby reselecting and camping on a cell having a better channel.

Figure 4:
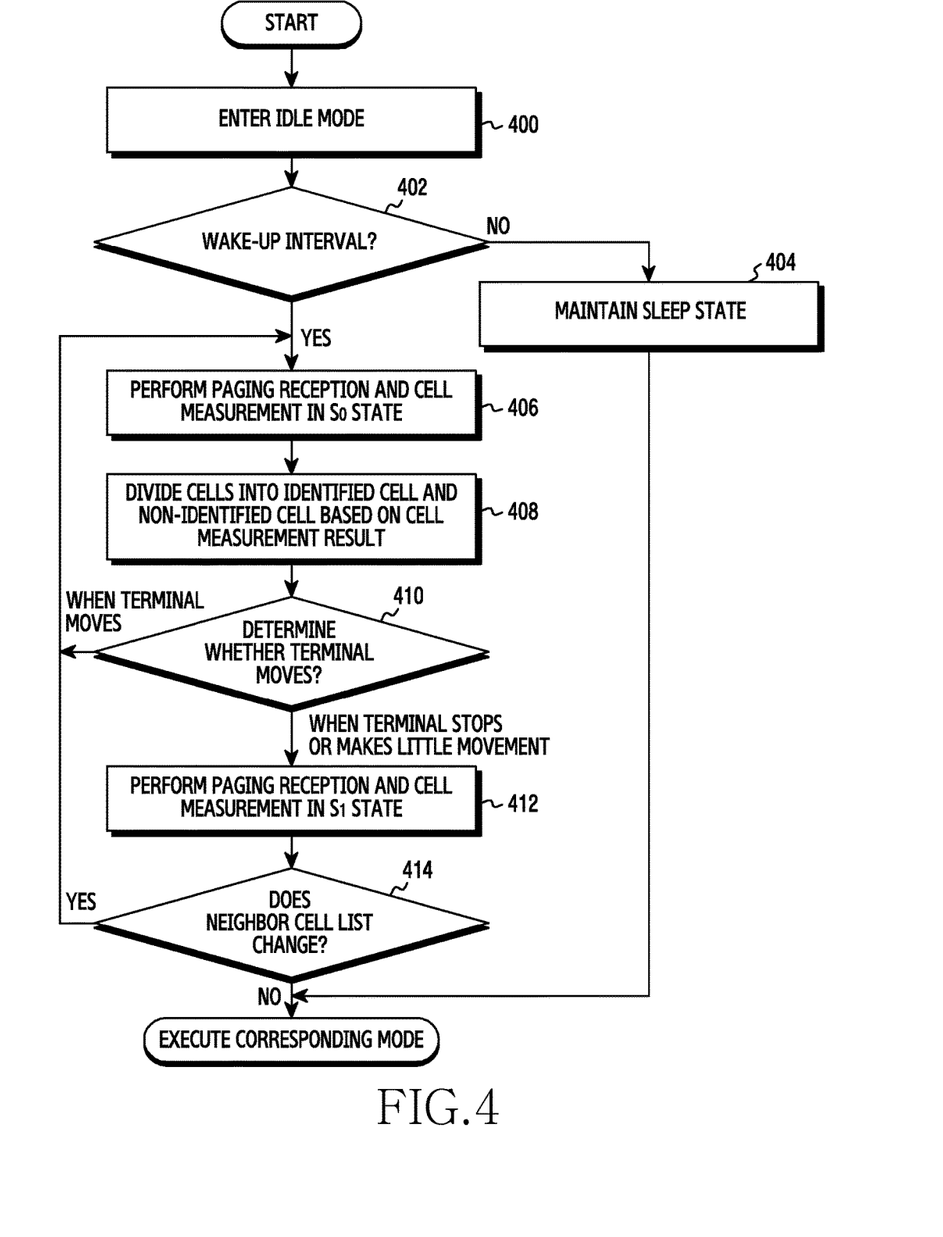
FIG. 4 is a flowchart illustrating a method including an operation in an idle state of a mobile terminal, according to an embodiment of the present disclosure.

FIG. 4 is a flowchart illustrating a method including an operation in an idle state of the mobile terminal, according to an embodiment of the present disclosure.

Referring to FIG. 4, when there is no call origination/termination or no transmitted/received data, the mobile terminal enters an idle mode, at step 400.

The mobile terminal determines whether the mobile terminal is in a wake-up interval during the DRX cycle of FIG. 1A, at step 402.

When the mobile terminal is not in the wake-up interval during the DRX cycle, the mobile terminal proceeds to step 404 to maintain a sleep state.

When the mobile terminal is in the wake-up interval during the DRX cycle, the mobile terminal proceeds to step 406 to perform paging reception and cell measurement in an S0 state. For example, the cell measurement may be CPICH Ec/Io or CPICH RSCP measurement of inter-frequency cells of intra-frequency cells based on a first measurement period.

The mobile terminal divides the cells into an identified cell and a non-identified cell based on a result of the cell measurement, at step 408. For example, when CPICH Ec/Io or CPICH RSCP of the cell is greater than a predefined threshold, the mobile terminal determines the cell as the identified cell. When CPICH Ec/Io or CPICH RSCP of the cell is less than or equal to the predefined threshold, the mobile terminal determines the cell as the non-identified cell.

The mobile terminal determines whether the mobile terminal is in a stop state or a mobile state based on the result of the cell measurement and information on an identified cell set and a non-identified cell set, at step 410. A method for determining whether the mobile terminal is in the stop state or the mobile state will be described in greater detail below with reference to FIG. 5.

When the mobile terminal is in the stop state or the mobile terminal makes slight movement or motion, the mobile terminal proceeds to step 412 to perform cell measurement based on state transition from the S0 state to the S1 state. When the mobile terminal makes movement greater than a predefined threshold, the mobile terminal proceeds to step 406 to perform cell measurement in the state of S0.

That is, in a case where a measurement period of the state of S0 is shorter than a measurement period of the state of S1, a measurement period of cells included in the non-identified cell set is controlled to be longer when the mobile terminal is in the stop state or makes slight movement, and a measurement period of cells included in the non-identified cell set is controlled to be shorter when the mobile terminal has greater movement than a predefined threshold.

When the mobile terminal makes a greater movement than the threshold, measurement periods of all neighboring cells (e.g., identified cell set+non-identified cell set) may be controlled.

The mobile terminal in the state of S1 determines whether a neighboring cell list changes, at step 414, and performs cell measurement based on transition to the state of S0 from the state of S1, in which the neighboring cell list changes.

When there is no change in the neighboring cell list, a corresponding mode may be executed. For example, the mobile terminal may maintain the current state of S1 and the cell measurement.

Figure 5:
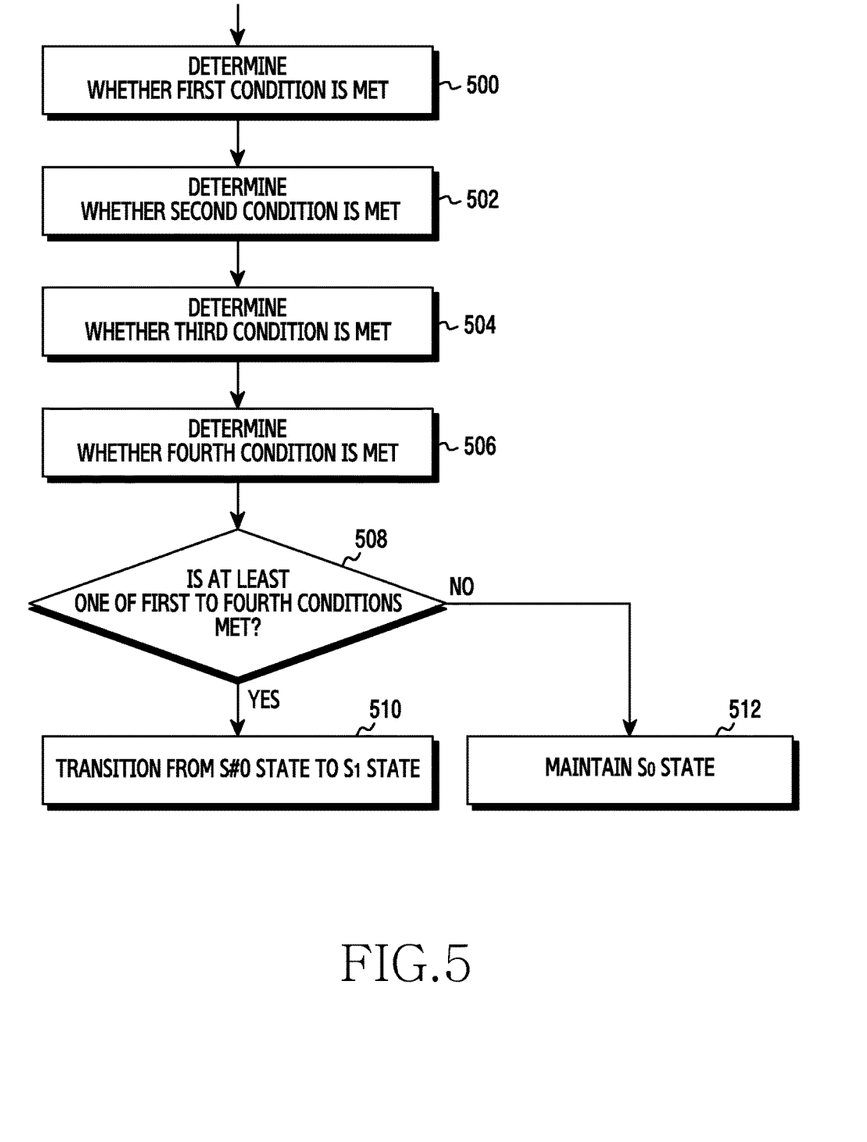
FIG. 5 is a flowchart illustrating a method of changing a cell measurement period based on whether a mobile terminal has movement, according to an embodiment of the present disclosure.

FIG. 5 is a flowchart illustrating a method of changing a cell measurement period based on whether the mobile terminal moves, according to an embodiment of the present disclosure.

Referring to FIG. 5, in the state of S0, the mobile terminal determines whether a first condition is met, at step 500, determines whether a second condition is met, at step 502, determines whether a third condition is met, at step 504, and determines whether a fourth condition is met, at step 506. Determining whether the first to fourth conditions are met may be performed sequentially, in parallel, or simultaneously.

The first condition may be a condition when received power (or energy) of a serving cell is greater than a first predefined threshold during a predetermined time interval, the second condition may be a condition when there is no change in the identified cell set (or non-identified cell set) during a predetermined time interval (or when the number of changed cells within the identified cell set is less than a second predefined threshold), the third condition may be a condition when the number of identified cell sets is greater than a third predefined threshold during a predetermined time interval (or that the number of non-identified cell sets is less than a predefined threshold), and the fourth condition may be a condition when variance of received power that is calculated from received power of N previous serving cells is less than a fourth predefined threshold.

The first condition to the fourth condition may be used as conditions for determining whether the mobile terminal is in the stop state or mobile state. However, the condition for determining whether the mobile terminal is in the stop state or mobile state is not limited to the first condition to the fourth condition, and another condition may be further used or one or more of the first condition to the fourth condition may be excluded. For example, the stop state or mobile state of the mobile terminal may be determined using sensors installed in the mobile terminal.

When at least one of the first to fourth conditions is met, at step 508, the mobile terminal determines that the mobile terminal is in the stop state and transitions from the state of S0 to the state of S1, at step 510. When all of the first to fourth conditions are not met, the mobile terminal maintains the state of S0, at step 512.

For example, the measurement period of the non-identified cell set according to the transition state may be defined as illustrated in Table 2 below.

TABLE 2

| State | Number of cells to be measured on every DRX cycle | Others |
|---|---|---|
| S0 | cells/M1 | M1 >= 1 |
| S1 | cells/M2 | M2 > M1 |

When the neighboring cell list changes or the first to fourth conditions are not met, the mobile terminal transitions from the state of S1 to the state of S0.

For example, in the state of S1, the mobile terminal determines whether the first condition is met, determines whether the second condition is met, determines whether the third condition is met, and determines whether the fourth condition is met. Thereafter, when all of the first to fourth conditions are not met, the mobile terminal transitions back from the state of S1 to the state of S0. When all of the first to fourth conditions are not met, the mobile terminal determines that it is in the mobile state.

Further, when the neighboring cell list changes in the state of S1, the mobile terminal transitions from the state of S1 to the state of S0.

Figure 6:
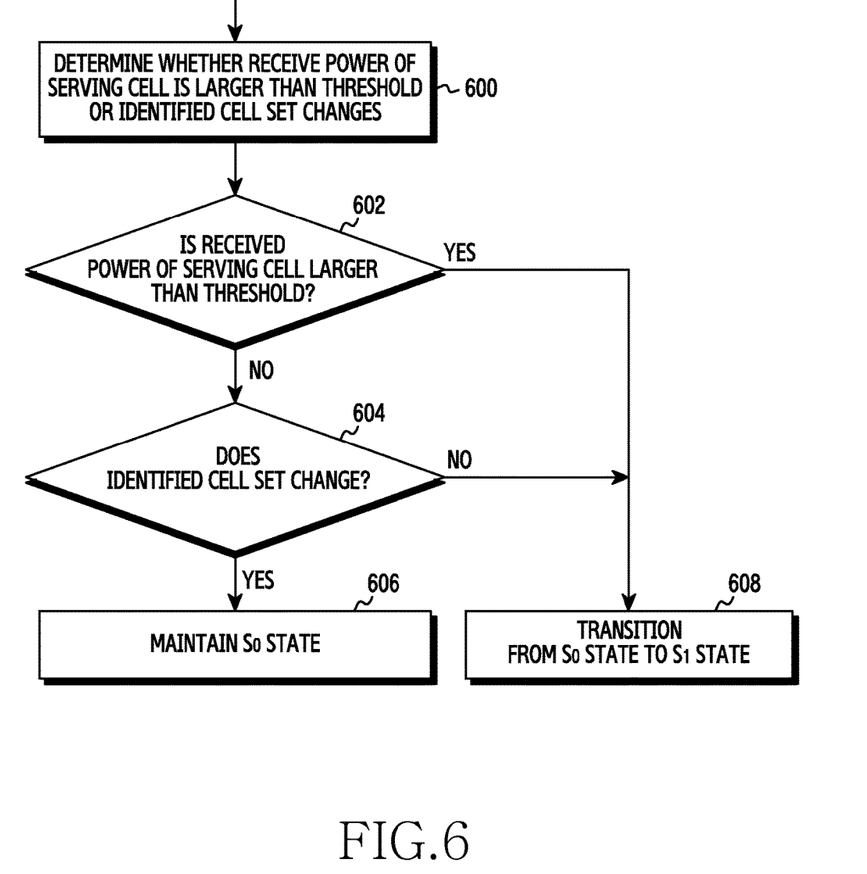
FIG. 6 is a flowchart illustrating a method of changing a cell measurement period based on received power of a cell, according to an embodiment of the present disclosure.

FIG. 6 is a flowchart illustrating a method of changing a cell measurement period based on received power of a cell, according to an embodiment of the present disclosure.

Referring to FIG. 6, the mobile terminal determines whether received power (or energy) of the serving cell is greater than a predefined threshold or an identified cell set changes, at step 600. The identified cell set refers to cells having received power greater than a predefined threshold.

When the received power (or energy) of the serving cell is greater than the predefined threshold, at step 602, the mobile terminal transitions from the state of S0 to the state of S1, at step 608, and configures a measurement period of the cells to be longer.

When there is no change in the identified cell set, at step 604, the mobile terminal transitions from the state of S0 to the state of S1, at step 608, and configures a measurement period of the cells to be longer.

When the received power (or energy) of the serving cell is less than the predefined threshold or the identified cell set changes, the mobile terminal maintains the state of S0, at step 606.

Figure 7:
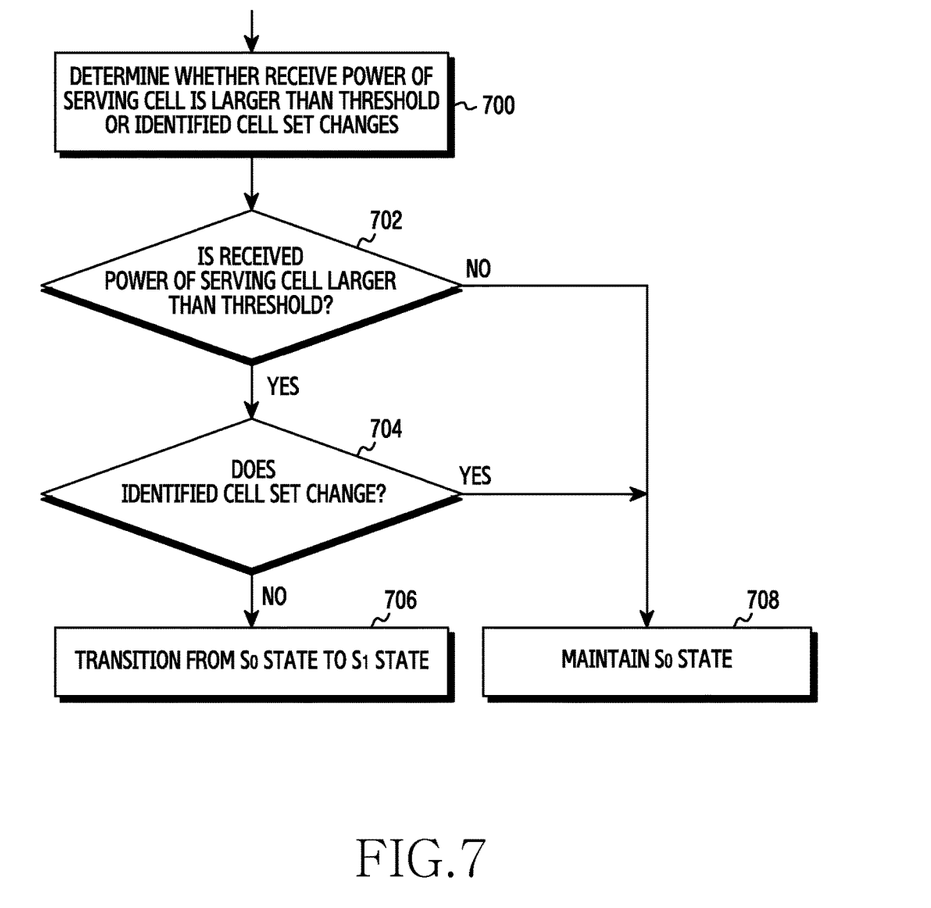
FIG. 7 is a flowchart illustrating a method of changing a cell measurement period based on received power of a cell, according to an embodiment of the present disclosure.

FIG. 7 is a flowchart illustrating a method of changing a cell measurement period based on received power of a cell, according to an embodiment of the present disclosure.

Referring to FIG. 7, the mobile terminal determines whether received power (or energy) of the serving cell is greater than a predefined threshold or an identified cell set changes, at step 700. The identified cell set refers to cells having received power greater than a predefined threshold.

When the received power (or energy) of the serving cell is smaller than the predefined threshold, at step 702, the mobile terminal maintains the state of S0, at step 708.

When the identified cell set changes, at step 704, the mobile terminal maintains the state of S0 at step 708.

When the received power (or energy) of the serving cell is greater than the predefined threshold or there is no change in the identified cell set, the mobile terminal transitions from the state of S0 to the state of S1, at step 706, and configures a measurement period of the cells to be longer.

Figure 8:
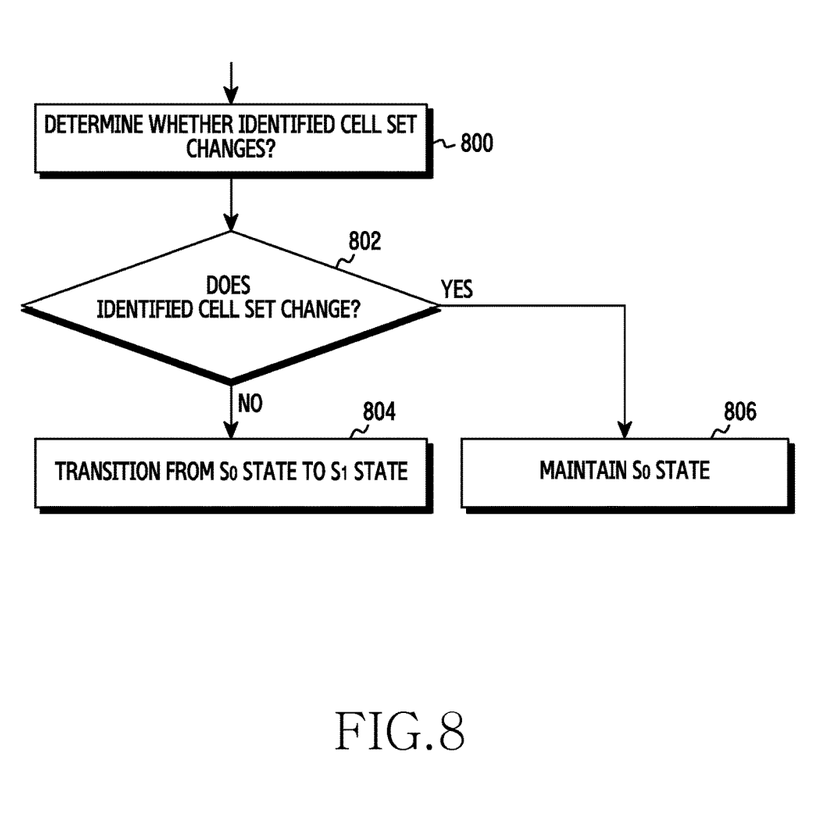
FIG. 8 is a flowchart illustrating a method of changing a cell measurement period based on whether there is a change in an identified cell set, according to an embodiment of the present disclosure.

FIG. 8 is a flowchart illustrating a method of changing a cell measurement period based on whether there is a change in an identified cell set, according to an embodiment of the present disclosure.

Referring to FIG. 8, the mobile terminal determines whether an identified cell set changes, at step 800. The identified cell set refers to cells having received power greater than a predefined threshold.

When there is no change in the identified cell set, at step 802, the mobile terminal transitions from the state of S0 to the state of S1, at step 804, and configures a measurement period of the cells to be longer.

When the identified cell set changes, at step 802, the mobile terminal maintains the state of S0, at step 806.

Figure 9:
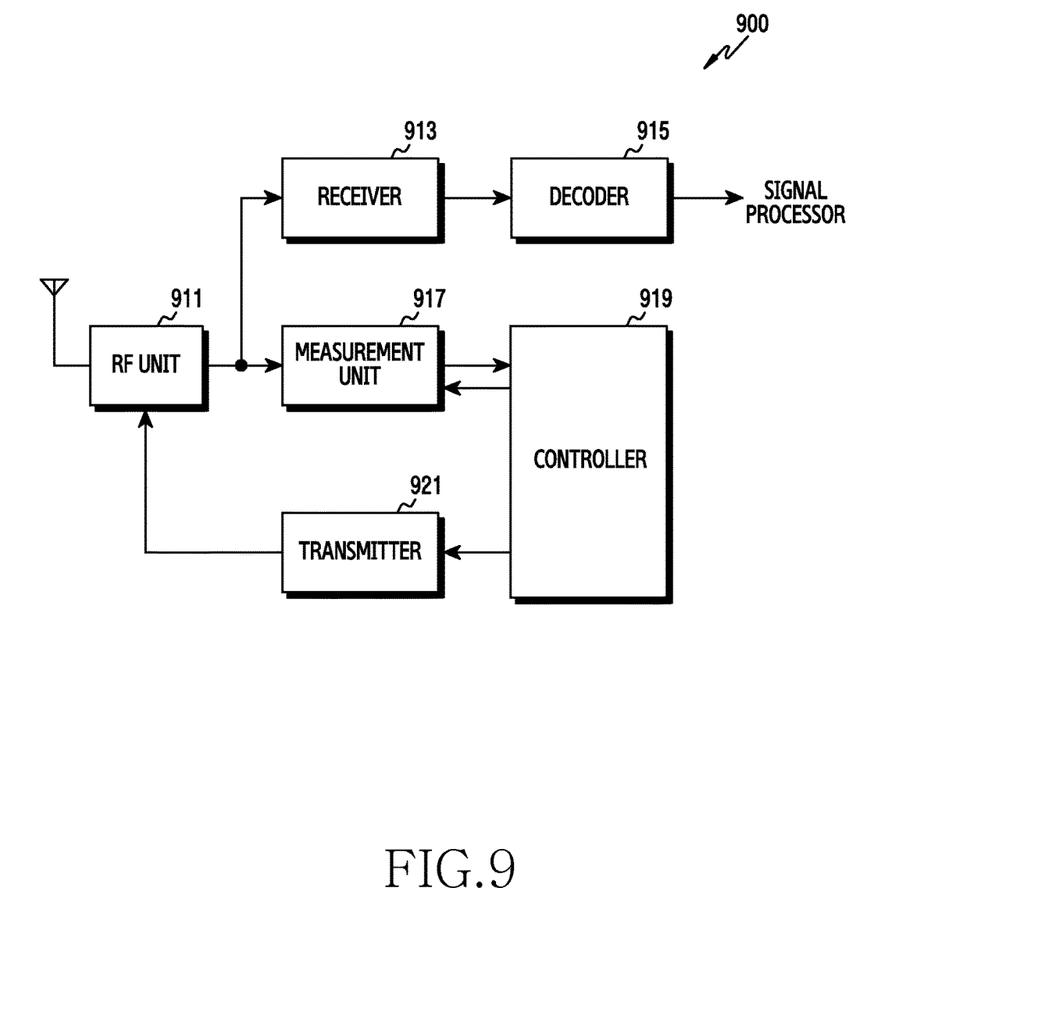
FIG. 9 is a block diagram of a mobile terminal, according to an embodiment of the present disclosure.

FIG. 9 is a block diagram of the mobile terminal 900, according to an embodiment of the present disclosure. The components of the mobile terminal may also be used with a base station.

Referring to FIG. 9, an RF unit 911 performs a function of frequency-down converting an RF signal received through an antenna to convert the RF signal into a signal of a baseband frequency.

A receiver 913 determines a level of a symbol by despreading the received signals output from the RF unit 911 and accumulating the received signals in the unit of symbols. The despreading includes PN despreading and orthogonal despreading.

A decoder 915 decodes symbols output from the receiver 913 and outputs the decoded symbols.

A measurement unit 917 divides or categorizes a plurality of cells including a serving cell into an identified cell set and a non-identified cell set based on received power of the plurality of cells and measures received power of each of the plurality of cells including the serving cell based on a first measurement period during a first time interval. Further, a result of the measurement may be provided to a controller 919. For example, as illustrated in FIGS. 1B-1D, the received power of the plurality of cells may be measured during every cell measurement interval of the wake-up interval during the DRX cycle. The measurement period may be controlled by a control signal output from the controller 919.

The controller 919 controls the overall operations of the mobile terminal 900. The controller 919 determines whether received power of the serving cell is greater than a second predefined threshold or whether the number of cells included in the identified cell set or configuration of the cells changes. When the received power of the serving cell is greater than the second predefined threshold or the number of cells included in the identified cell set or the configuration of the cells does not change, the controller 919 changes the measurement period to second measurement period, which is longer than the first measurement period during a second time interval. The identified cell set may include one or more cells having received power that is greater than the first predefined threshold from among the plurality of cells, and the non-identified cell set may include one or more cells having received power equal to or less than the first predefined threshold from among the plurality of cells.

The controller 919 reduces the number of cells to be measured based on the measurement period in order to change the measurement period to the second measurement period, which is longer than the first measurement period.

In order to reduce the number of cells to be measured based on the measurement period, the controller 919 disperses a number of a plurality of measurement periods according to a total number of cells to be measured based on the measurement period.

In order to reduce the number of cells to be measured based on the measurement period, the controller 919 may not perform cell measurement based on at least one of a plurality of measurement periods during the second time interval.

The cell measurement may be at least one of a measurement of received power of at least one intra-frequency cell and a measurement of received power of at least one inter-frequency cell.

When received power of the plurality of cells is measured based on the first measurement period during the first time interval, received power of each cell of the identified cell set may be measured through a multipath search without a cell search process, and received power of each cell of the non-identified cell set may be measured through a multipath search after a cell search process. The cell search process acquires one or more of slot synchronization, frame synchronization and code-group identification, and scrambling code identification.

The measurement unit 917 may further measure received power of each of the plurality of cells based on the second measurement period during the second time interval.

A transmission operation of a transmitter 921 may be controlled by a control signal output from the controller 919. For example, the transmitter 921 may spread transmission data to provide the spread transmission data to the RF unit 911. The spreading of transmission data may include PN spreading and orthogonal spreading.

The RF unit 911 converts a frequency of a baseband into a frequency of an RF band through frequency up converting and radiates an RF signal through an antenna.

Figure 10:
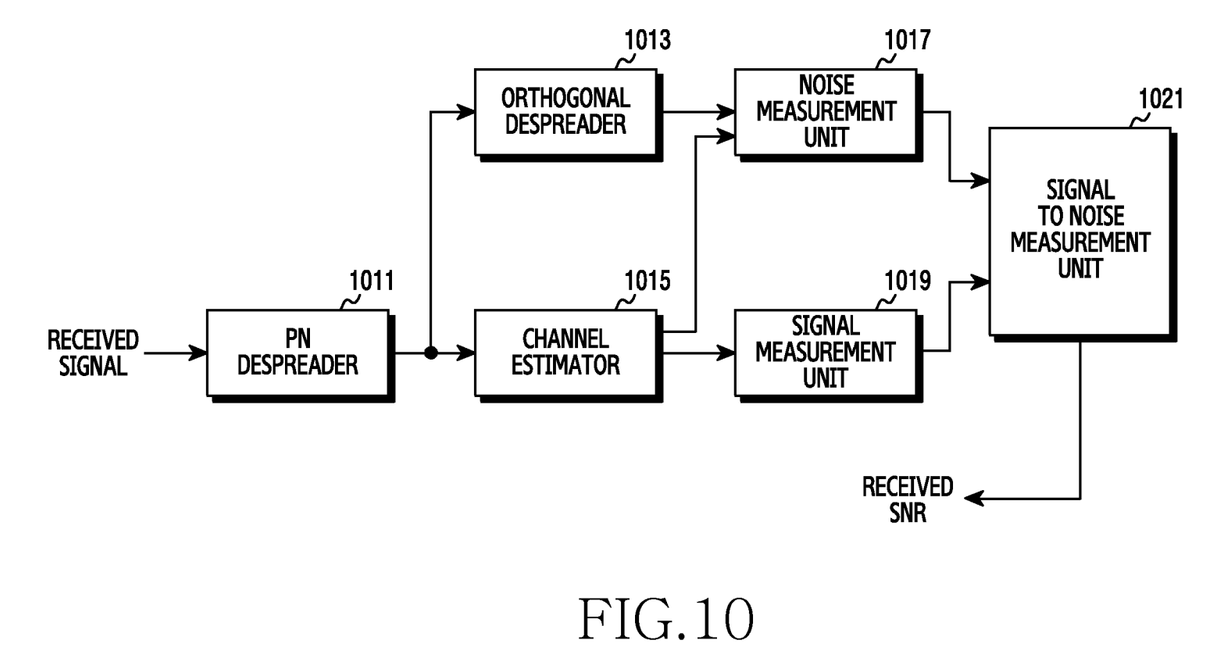
FIG. 10 is a block diagram of a measurement unit shown in FIG. 9, according to an embodiment of the present disclosure.

FIG. 10 is a block diagram of the measurement unit 917 shown in FIG. 9, according to an embodiment of the present disclosure.

Referring to FIG. 10, a PN despreader 1011 despreads received signals of a forward link based on a PN sequence.

An orthogonal despreader 1013 despreads the PN-despread signals by using an orthogonal code of a corresponding channel. The orthogonal code may be a Walsh code and the channel may be a pilot channel.

A channel estimator 1015 receives an output of the PN despreader 1011, namely, the PN-despread signal, and generates a channel estimation signal.

A noise measurement unit 1017 receives the output of the orthogonal despreader 1013 and the output of the channel estimator 1015 and detects noise or interference components from the two signals.

The signal measurement unit 1019 receives the output of the channel estimator 1015 and measures data bit energy (Eb) or pilot bit energy (Ec) from the signals.

A signal to noise measurement unit 1021 inputs a noise component (Nt) or an interference component (Io) output from the noise measurement unit 1017 and a signal strength (Eb) output from the signal measurement unit 1019, and calculates a Signal to Noise Ratio (SNR) through Eb/Nt calculation, or calculates a ratio of pilot bit energy accumulated for one PN chip period to total power spectral density in a reception band through Ec/Io calculation.

As described above, when the mobile terminal 900 is in the idle state in a cellular mobile communication system, consumption of standby power of the mobile terminal 900 can be reduced by determining whether the mobile terminal 900 is in the stop state to control a cell measurement period.

Further, the wake-up interval in the DRX cycle can be shorter by controlling a cell measurement period.

The embodiments disclosed herein can be implemented through a System on Chip (SoC) platform. For example, the components illustrated in FIGS. 9 and 10, which are associated with the mobile terminal, can be integrated on one or more substrates of an SoC.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of reducing power consumption of a mobile terminal, the method comprising:
   measuring received power of each of a plurality of cells including a serving cell during a first measurement period;
   categorizing the plurality of cells into an identified cell set and a non-identified cell set based on measurement for the received power of the plurality of cells, wherein the identified cell set includes one or more cells having received power that is greater than predefined threshold and the non-identified cell set includes one or more cells having received power that is less than or equal to the predefined threshold;
   determining whether a number of cells included in the identified cell set changes during a predefined interval or not; and
   in response to determining that the number of cells included in the identified cell set does not change during the predefined interval, changing the first measurement period to a second measurement period, which is longer than the first measurement period.

2. The method of claim 1, wherein changing the first measurement period to the second measurement period comprises reducing a number of cells to be measured based on the first measurement period.

3. The method of claim 2, wherein reducing the number of cells to be measured based on the first measurement period comprises dispersing a number of a plurality of measurement periods according to a total number of cells to be measured.

4. The method of claim 2, wherein reducing the number of cells to be measured based on the first measurement period comprises not performing cell measurement in relation to at least one of a plurality of measurement periods.

5. The method of claim 4, wherein the cell measurement includes at least one of a measurement of received power of at least one intra-frequency cell and a measurement of received power of at least one inter-frequency cell.

6. The method of claim 1, wherein, the received power of each of the plurality of cells is measured based on the first measurement period, received power of each cell of the identified cell set is measured through a multipath search without a cell search process, and received power of each cell of the non-identified cell set is measured through a multipath search after a cell search process.

7. The method of claim 6, wherein the cell search process acquires at least one of slot synchronization, frame synchronization and code group identification, and scrambling code identification.

8. The method of claim 1, further comprising measuring the received power of each of the plurality of cells during the second measurement period.

9. A system on chip (SoC) for reducing power consumption of a mobile terminal, the SoC comprising:
   a measurement module for categorizing a plurality of cells including a serving cell into an identified cell set and a non-identified cell set based on received power of the plurality of cells and measuring received power of each of the plurality of cells including the serving cell during a first measurement period, wherein the identified cell set includes one or more cells having received power that is greater than predefined threshold and the non-identified cell set includes one or more cells having received power that is less than or equal to the predefined threshold; and
   a controller module for determining whether a number of cells included in the identified cell set changes during predefined interval or not, and changing the first measurement period to a second measurement period, which is longer than the first measurement period, in response to determining that the number of cells included in the identified cell set does not change during the predefined interval.

10. The SoC of claim 9, wherein the controller module reduces a number of cells to be measured based on the first measurement period in order to change the first measurement period to the second measurement period.

11. The SoC of claim 10, wherein the controller module uses a plurality of measurement periods for a total number of cells to be measured based on the first measurement period in order to reduce the number of cells to be measured.

12. The SoC of claim 10, wherein the controller module does not perform cell measurement relating to at least one of a plurality of measurement periods in order to reduce the number of cells to be measured.

13. The SoC of claim 12, wherein the measurement module includes at least one of a measurement of received power of at least one intra-frequency cell and a measurement of received power of at least one inter-frequency cell.

14. The SoC of claim 9, wherein the received power of each of the plurality of cells is measured based on the first measurement period, received power of each cell of the identified cell set is measured through a multipath search without a cell search process, and received power of each cell of the non-identified cell set is measured through a multipath search after a cell search process.

15. The SoC of claim 14, wherein the cell search process acquires at least one of slot synchronization, frame synchronization and code group identification, and scrambling code identification.

16. The SoC of claim 9, wherein the measurement unit measures the received power of each of the plurality of cells based on the second measurement period.

* * * * *